United States Patent
Cinti et al.

(10) Patent No.: US 9,825,489 B2
(45) Date of Patent: Nov. 21, 2017

(54) METHOD OF CONTROLLING AN UNINTERRUPTIBLE POWER SUPPLY TO CLEAR A SHORTED LOAD

(71) Applicant: Chloride Srl, Castel Guelfo (IT)

(72) Inventors: Ugo Cinti, Calderara di Reno (IT); Guerino Vassallo, Castel Guelfo (IT); Matteo Lo Torto, Florence (IT); Gianni Dipietrangelo, Bologna (IT); Marco Bonora, San Lazzaro di Savena (IT); Edwin Shires, Powell, OH (US)

(73) Assignee: Vertiv S.R.L., Piove di Sacco (IT)

( * ) Notice: Subject to any disclaimer, the term of this patent is extended or adjusted under 35 U.S.C. 154(b) by 376 days.

(21) Appl. No.: 14/605,263

(22) Filed: Jan. 26, 2015

(65) Prior Publication Data

US 2016/0218557 A1    Jul. 28, 2016

(51) Int. Cl.
     *H02J 7/00*          (2006.01)
     *H02J 9/00*          (2006.01)
     *H02J 9/06*          (2006.01)
     *H02M 1/32*        (2007.01)
     *H02M 7/483*       (2007.01)

(52) U.S. Cl.
CPC .............. *H02J 9/061* (2013.01); *H02J 7/007* (2013.01); *H02J 7/0031* (2013.01); *H02J 9/062* (2013.01); *H02M 1/32* (2013.01); *H02M 7/483* (2013.01)

(58) Field of Classification Search
CPC .. H02J 9/061; H02J 9/062; H02J 7/007; H02J 7/0031; H02M 1/32; H02M 7/483
USPC ........................................................ 307/66
See application file for complete search history.

(56) References Cited

U.S. PATENT DOCUMENTS

| | | | |
|---|---|---|---|
| 4,674,021 A | 6/1987 | Sachs | |
| 7,126,409 B2 | 10/2006 | Nielsen | |
| 8,462,524 B2 | 6/2013 | Gekeler | |
| 2005/0281065 A1 | 12/2005 | Nojima | |
| 2013/0135908 A1 | 5/2013 | Oedegard et al. | |
| 2014/0036555 A1 | 2/2014 | Kolhatkar et al. | |
| 2014/0233290 A1 | 8/2014 | Spanos et al. | |
| 2014/0247634 A1 | 9/2014 | Takizawa | |

FOREIGN PATENT DOCUMENTS

EP           512531 A2     11/1992

OTHER PUBLICATIONS

Zhang Wenping et al: "A fault-tolerant T-type three-level inverter system". 2014 IEEE Applied Power Electronics Conference and Exposition—APEC 2014, IEEEE, Mar. 16, 2014 (Mar. 16, 2014), pp. 274-280, XP032590891, DOI: 10.1109/APEC.2014.6803321.
International Search Report and Written Opinion of the International Search Authority for PCT/IB2016/050343, dated May 11, 2016.
Insulated Gate Bipolar Transistor (IGBT) Basics, Abdus Sattar, IXYS Corporation, before Jan. 26, 2014.
On Semiconductor IGBT Applications Handbook, Apr. 2014.

*Primary Examiner* — Richard Tan

(57) ABSTRACT

An uninterruptible power supply system has a three-level T-Type inverter A method that improves clearing a short of a load coupled to an output of the inverter when the load experiences a short circuit event includes commutating with a controller each phase of the inverter in a two level mode current generation when output voltage and output current of that phase have the same direction and commutating each phase of the inverter in a three level mode current generation when the output voltage and output current of that phase have opposite directions.

3 Claims, 4 Drawing Sheets

METHOD OF CONTROLLING AN UNINTERRUPTIBLE POWER SUPPLY TO CLEAR A SHORTED LOAD

FIELD

The present disclosure relates to large uninterruptible power supply ("UPS") systems such as those used to provide power for data centers, and more particularly, to short circuit management control in such UPS systems.

BACKGROUND

This section provides background information related to the present disclosure which is not necessarily prior art.

In a typical data center, the UPS systems used to provide power to data centers need to manage short circuit conditions which may occur from power distribution or load failures. These UPS systems typically have a capacity of 40 kVA or higher. Short circuit currents may be many times higher than the rated load of an UPS system. If they are not interrupted, they can cause the disruption of the equipment (such as loss of basic insulation, arcing from live parts, and the like). Consequently, overcurrent protection devices such as circuit breakers or fuses are provided upstream of the UPS system to limit the short circuit in peak and duration and downstream of the UPS system to protect loads coupled to the UPS. If a load downstream of the UPS system experiences a short circuit, the UPS system needs to "clear" the short circuit quickly enough so that the other loads coupled to the UPS system are not affected. In general, the period of time that the UPS has to clear the short circuit is the backup time of a typical load. Loads in data centers, such as servers, coupled to a UPS system usually have a short period of time during which they will continue to operate in the event of a power interruption, which is commonly known as the load backup time. The UPS system clears a short circuited load by feeding sufficient current to the short circuited load to trip the circuit protection device protecting the load, that is, to trip a circuit breaker if the overcurrent protection device is a circuit breaker or blow a fuse if the overcurrent protection device is a fuse. This disconnects the short circuited load from the UPS system taking the load offline. The UPS system can then continue to provide power to the other loads coupled to the UPS system.

The minimum load backup time is usually 10 ms. This means that the power outage (or interruption) due to clearing a short circuit of a load needs to be less than 10 ms to avoid affecting the other loads coupled to the UPS system. This means that the overcurrent protection devices protecting the load must open within this time period. To achieve this usually means that a fuse (or fuses in the case of multi-phase power) is used as the overcurrent protection device for the load.

When the UPS system feeds the load through the static transfer switch (low impedance path), overcurrent protection at the load can be easily implemented with slow blow fuses rated at a nominal current which can also be very close to the nominal current of the UPS system. For those situations where the short circuit clearance is accomplished by feeding the load by the inverter of the UPS system and a slow blow fuse is used to protect the load, there is a risk that the time that it will take to blow the fuse will exceed the minimum back-up time. To ameliorate this risk, a fuse rated less than the nominal output current of the UPS system can be used to protect the load. Other solutions are to use oversize inverters in the UPS system or use a fast blow fuse to protect the load instead of a slow blow fuse, both of which tend not to be cost effective.

FIG. 1 is a simplified schematic of a typical prior art UPS system 100. The basic elements of UPS system 100 are rectifier 102, inverter 104, a DC power source such as battery 106, a controller 108, and a static transfer switch 110. Battery 106 may be coupled through a boost circuit 107 to an input 105 of inverter 104, which is also coupled to an output 103 of rectifier 102. An input 114 of rectifier 102 is coupled through disconnect switch 116 to a primary power source 115 of power, typically an AC feed from a utility. An input 118 of static transfer switch 110 is coupled through disconnect switch 120 to a secondary power source 122 of power, typically an AC feed from a utility, and an output 124 of static transfer switch 110 is coupled to an output 126 of inverter 104. Output 126 of inverter 104 is coupled through a disconnect switch 128 to output 112 of UPS system 100. Output 112 of UPS system 100 is coupled through a manual bypass switch 130 to secondary power source 122. It should be understood that primary power source 115 and secondary power source 122 can be different power sources or the same power source, such as the same utility feed coupled to both disconnect switches 116, 120. Static transfer switch 110 is used to switch load 134 connected to an output 112 of UPS system 100 to secondary power source 122. A fuse 138 is used to protect load 134 and is coupled in series between load 134 and the output 112 of UPS system 100. In this regard, when static transfer switch 110 is closed, the load is connected to secondary power source 122 and when static transfer switch is open, the load is disconnected from secondary power source 122 (unless the manual bypass switch 130 has been closed).

Controller 108 is configured to control UPS system 100 including controlling inverter 104 by varying the duty cycle of the switching devices in inverter 104 so that inverter 104 provides a desired output voltage. Controller 108 also controls static transfer switch 110 to cause it to switch between closed and open. Controller 108 can be, be part of, or include: an Application Specific Circuit (ASIC); an electronic circuit; a combinational logic circuit; a field programmable gate array (FPGA); and/or a processor such as a Digital Signal Processor (DSP), microcontroller, or the like. It should be understood that controller 108 may include one or more than one of the foregoing, such as digital controller based on DSPs that control each of the functional blocks of UPS system 100 by generating the proper switching signals to switch the power semiconductors such as IGBTs and thyristors.

Rectifier 102 may be a three phase rectifier having three full rectification legs (and illustratively uses power switching devices such as IGBTs), one for each phase, and inverter 104 may be a three phase inverter having three inverter legs, one for each phase. Inverter 104 also illustratively uses power switching devices such as IGBTs. Rectifier 102 and inverter 104 are configured in a double conversion path with UPS system 100 thus being a double conversion UPS.

Static transfer switch 110 is typically implemented with power semiconductor switching devices. One type of power semiconductor switching device used in implementing static transfer switches is the thyristor since it is a very robust device, is relatively inexpensive, and has low losses. Typically, a static transfer switch implemented with thyristors has a pair of reverse connected thyristors 132 for each phase. That is, if UPS system 100 is a three phase system, static transfer switch 110 would have three pairs of reverse connected thyristors 132, one for each phase. It should be understood that each thyristor 132 may include a plurality of parallel connected thyristors 132 to provide the requisite power handling capability.

SUMMARY

This section provides a general summary of the disclosure, and is not a comprehensive disclosure of its full scope or all of its features.

An uninterruptible power supply system has a three-level T-Type inverter and in accordance with an aspect of the present disclosure, a method of clearing a short of a load coupled to an output of the inverter when the load experiences a short circuit event includes commutating with a controller each phase of the inverter in a two level mode current generation when output voltage and output current of that phase have the same direction and commutating each phase of the inverter in a three level mode current generation when the output voltage and output current of that phase have opposite directions.

In an aspect, the inverter has an inverter leg for each phase of the inverter with each inverter leg having a plurality of power switching semiconductors interconnected in a three-level T-Type inverter topology. Commutating each phase of the inverter in the two level mode current generation when the output voltage and output current of that phase have the same direction includes commuting with the controller the power switching semiconductors of that phase in the two level mode current generation and commutating each phase of the inverter in the three level mode current generation when the output voltage and output current of that phase have the opposite directions includes commuting with the controller the power switching semiconductors of that phase in the three level mode current generation.

In an aspect, upon the output voltage and output current of any phase of the inverter transitioning between being in the same direction to being in the opposite directions, changing the commutation with the controller of that phase of the inverter from two level mode current generation to three level mode current generation when the output voltage and output current of that phase has transitioned from being in the same direction to being in the opposition directions and changing the commutation with the controller of that phase of the inverter from three level mode current generation to two level mode current generation when the output voltage and output current of that phase has transitioned from being in the opposite directions to being in the same direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
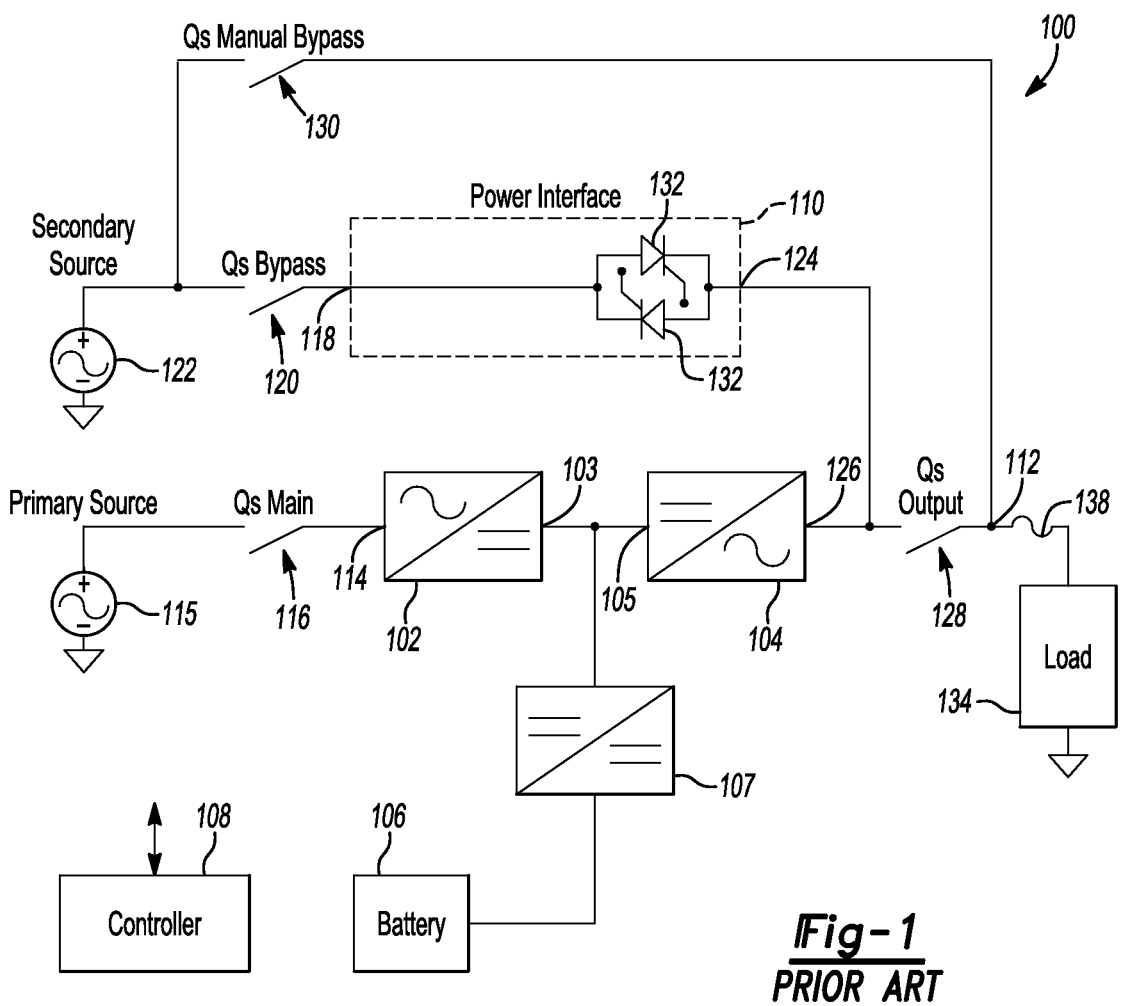
FIG. 1 is simplified schematic of a prior art UPS system.
Figure 2:
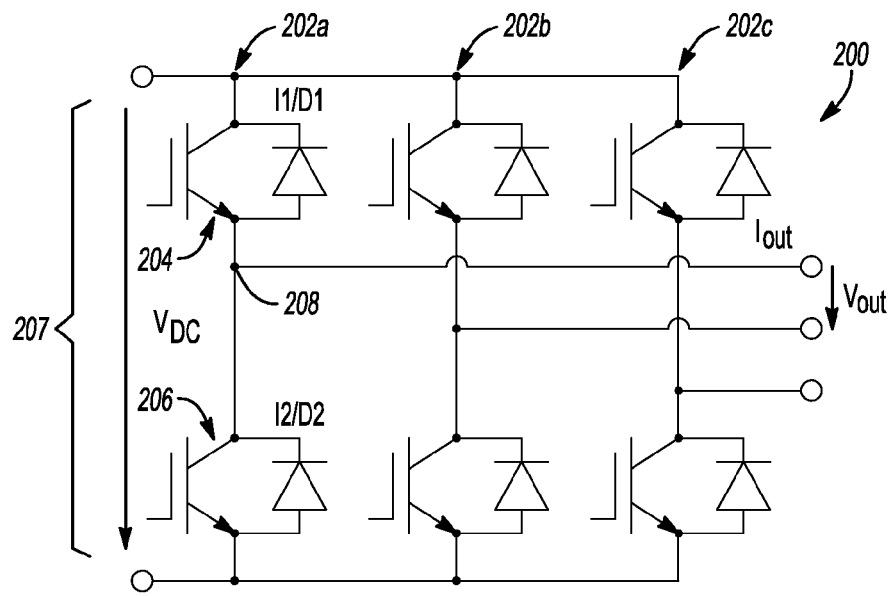
FIG. 2 is circuit topology of a prior art three-phase inverter two-level inverter.

Inverters used in UPS systems are typically classified as two-level and three-level inverters. FIG. 2 shows a typical prior art three-phase two-level inverter 200. Two-level inverter 200 has three inverter legs 202a, 202b and 202c, one for each of the three phases. The three inverter legs have the same topologies and only the topology for inverter leg 202a is described. Inverter leg 202a includes two IGBT's 204, 206 coupled in series across a DC bus 207 of a UPS system, such as UPS system 100. A junction 208 of IGBT's 204, 206 is an output of inverter leg 202a. It should be understood that the inverters can use power switching semiconductors other than IGBT's, such as SCR's, Thyristors, MOSFETs, and the like.

Figure 3:
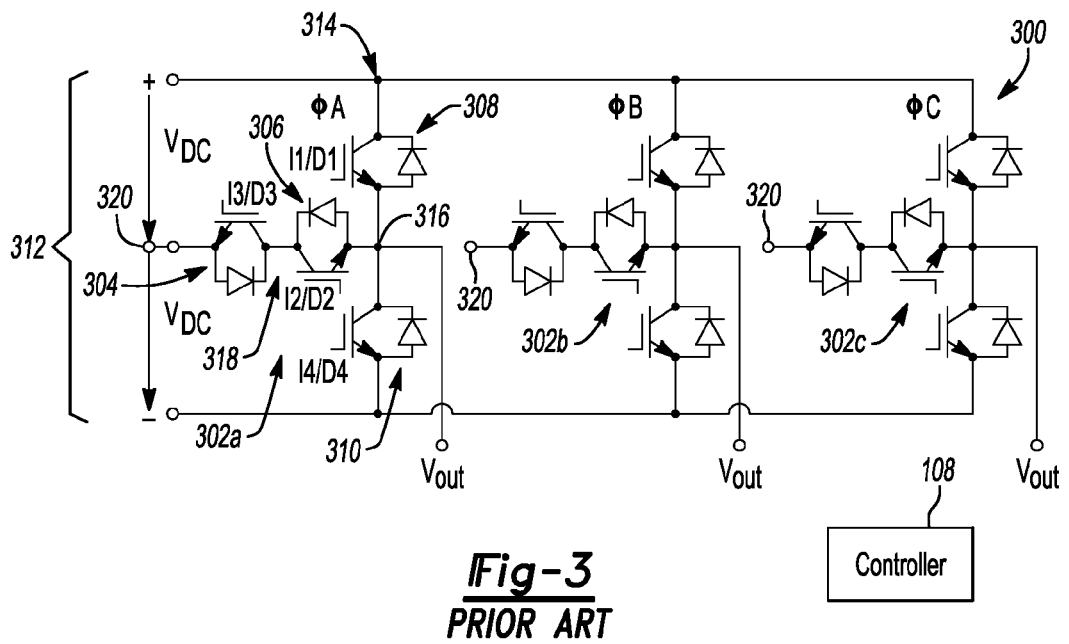
FIG. 3 is a circuit topology of a prior art three-phase three-level T-type inverter

FIG. 3 shows a typical prior art three-phase three-level T-Type inverter 300. Three-level inverter 300 has three inverter legs 302a, 302b and 302c, one for each of the three phases (φA, φB and φC) of inverter 300. The three inverter legs have the same topologies and only the topology for inverter leg 302a is described. Inverter leg 302a includes four IGBTs 304, 306, 308, 310. IGBTs 308, 310 are coupled in series across DC bus 312 of the UPS system such as UPS system 100 forming a vertical leg 314 of inverter leg 302a. IGBT's 304, 306 are coupled in series between a mid-point 320 of DC bus 312 and a junction 316 of IGBT's 308, 310 forming a horizontal leg 318 of inverter leg 302a. Junction 316 is also the output of the inverter leg 302a. Inverter leg 302a thus has a T configuration.

The three-level T-type inverter 300 can operate in a two level current generation mode and a three level current generation mode. The difference is that in two level current generation mode, IGBT's 304, 306 are always off and IGBT's 308, 310 are commutated (switched on and off at PWM duty cycle determined by the controller switching the IGBT's). In three level current generation mode, IGBT's 304, 306 are commutated as well as IGBT's 308, 310. The three-level T-type inverter 300 has the flexibility to allow the division of current generation between two level and three level. In three level current generation mode, this distributes losses between IGBT's 304, 306 of horizontal leg 318 and IGBT's 308, 310 of vertical leg 314. A drawback is when the inverter 300 is working in the two level current generation mode, the maximum output current is slightly reduced due to an increase in the ripple. It should be understood that FIG. 3 is labeled as prior art as the hardware components of inverter 300 and controller 108 are known in the art and does not mean that the method of switching the commutation of inverter 300 between two level current generation and three level current generation as described below is in the prior art.

Figure 6:
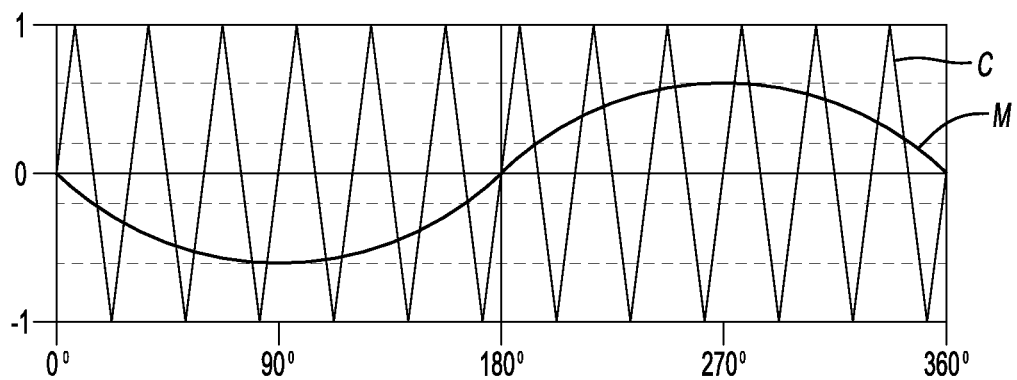
FIG. 6 is a timing diagram showing commutation of each phase of a three-phase three-level T-Type converter in two level current mode generation using sinusoidal pulse width modulation.
Figure 7:
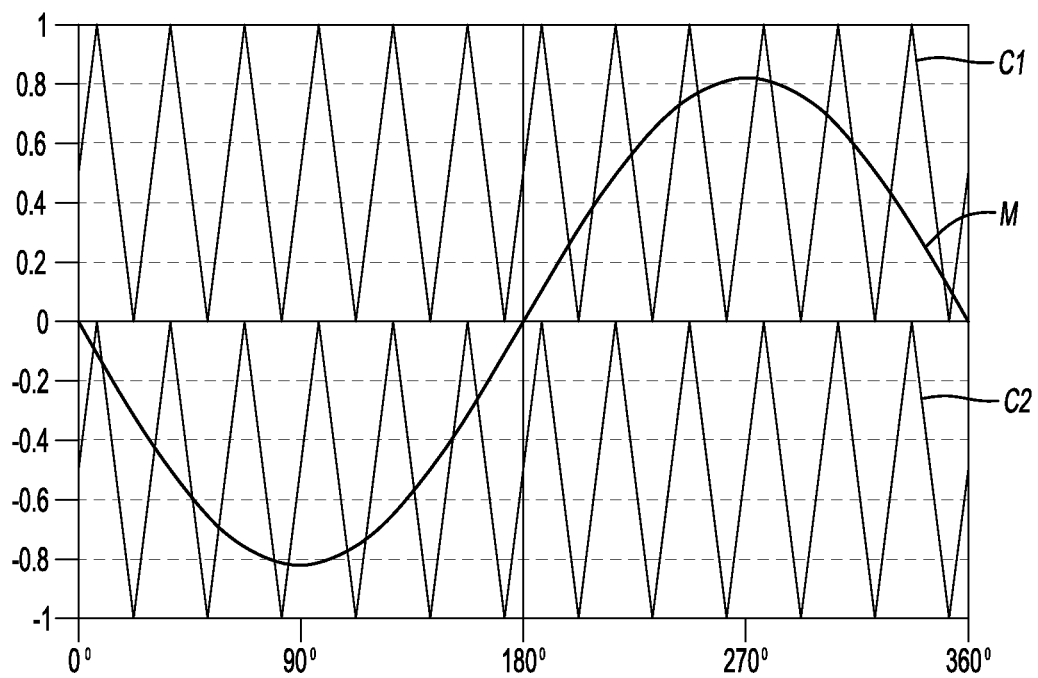
FIG. 7 is a timing diagram showing commutation of each phase of a three-phase three-level T-Type converter in three level current mode generation using sinusoidal pulse width modulation phase disposition.

In accordance with an aspect, inverter 300 is commutated using sinusoidal pulse width modulation when operated in the two level current generation mode and commutated using sinusoidal pulse width modulation phase disposition when operated in the three level current generation mode. In sinusoidal pulse width modulation, the PWM switching signal is generated by comparison of a triangle waveform (commonly known as a carrier signal) with a desired output waveform (commonly known as a modulating signal) which are shown in FIG. 6. When modulating signal M is greater than carrier signal C, IGBT 308 is on and IGBT 310 is off and when the modulating signal M is less than the carrier signal C, IGBT 308 is off and IGBT 310 is on. As discussed above, IGBT 304 and IGBT 306 remain off when inverter 300 is operated in the two level current generation mode. In sinusoidal pulse width modulation phase disposition, the PWM switching signal is generated by a comparison of two level shifted triangle waveforms (commonly known as carrier signals designated C1 and C2 in FIG. 7) at the switching frequency and a desired output waveform (commonly known as a modulating signal) which are shown in FIG. 7. The comparison of the modulating signal M with the carrier signal C1 controls IGBT 304 and IGBT 308. When the modulating signal M is greater than the carrier signal C1, IGBT 308 is on and IGBT 304 is off and when the modulating signal M is less than carrier signal C1, IGBT 308 is off and IGBT 304 is on. The comparison of the modulating signal M with carrier signal C2 controls IGBT 306 and IGBT 310. When the modulating signal M is greater than carrier signal C2, IGBT 306 is on and IGBT 310 is off and when the modulating signal M is less than carrier signal C2, IGBT 306 is off and IGBT 310 is on.

Figure 4:
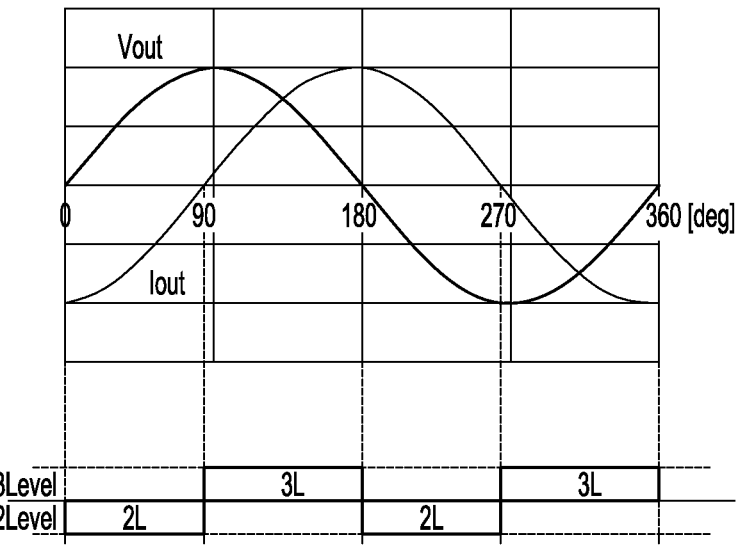
FIG. 4 is a graph illustrating the commutation of each phase of a three-phase three-level T-type inverter to clear a load short in accordance with an aspect of the present disclosure.

In accordance with an aspect of the present disclosure, commutation or switching of the IGBTs in a 3 level T-type inverter such as inverter 300 upon the occurrence of a short circuit event is controlled by controller 108 to switch operation of each phase of inverter 300 between 2 level mode current generation and 3 level mode current generation based whether the output voltage and current of that phase have the same direction or opposite directions. A short circuit event as used herein is when a load coupled to the output of inverter 300 has a short circuit. That is, as shown in FIG. 4, to manage clearing a short circuit failure of a load coupled to inverter 300, each inverter leg 302a, 302b, 302c of inverter 300 is commutated during the short circuit event in 2 level mode current generation when the output voltage and the output current of that inverter leg 302a, 302b, 302c have the same direction (both positive and negative) and in 3 level mode current generation in the phases when the output voltage and output current of that inverter leg 302a, 302b, 302c have opposite directions (both positive and negative). For example, when the output voltage and output current of inverter leg 302a have the same direction, controller 108 is configured to commutate inverter leg 302a in two level mode current generation and when the output voltage and output current of inverter leg 302a have opposite directions, controller 108 is configured to commutate inverter leg 302a in three level mode current generation.

Figure 5:
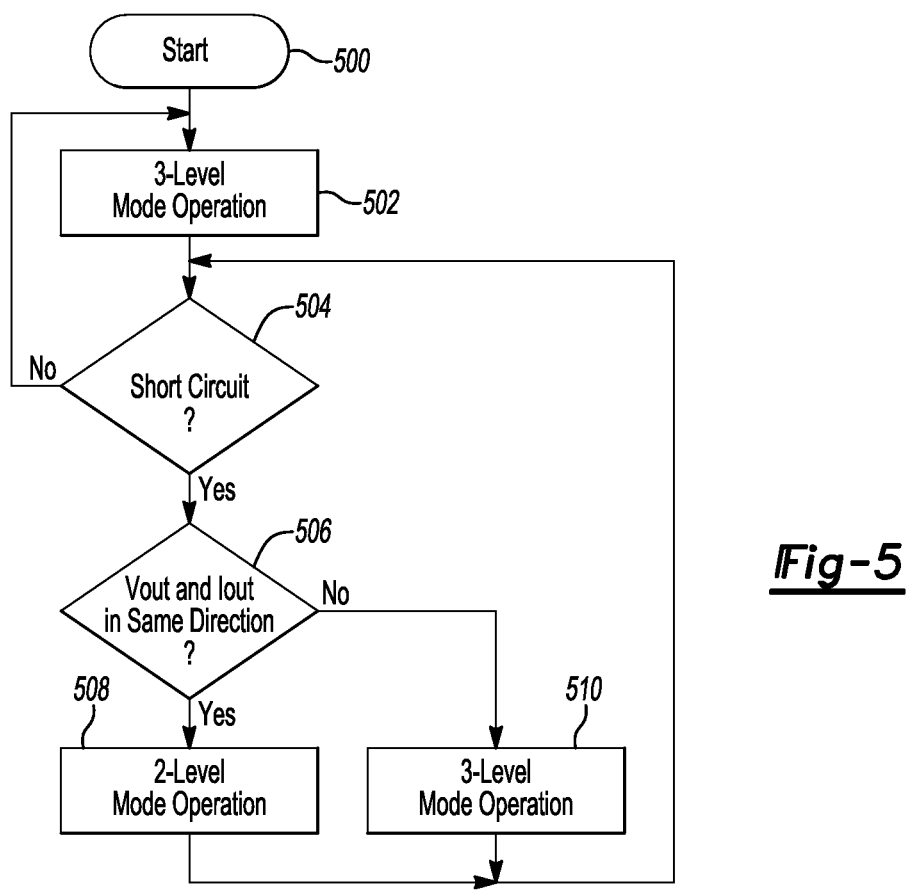
FIG. 5 is a flow chart of control logic for the commutation control of FIG. 4.

FIG. 5 is a flow chart of a method for managing a short circuit failure of a load in accordance with an aspect of the present disclosure. During normal operation at 500, inverter 300 is operated by a controller 108 in 3 level mode current generation. Upon detection of a short circuit failure at 502, controller 108 branches to 504 where for each phase of inverter 300 it checks whether the output voltage and output current of that phase have the same direction, which is the case when the output voltage and the output current are both increasing or are both decreasing. If the output voltage and output current have the same direction, controller 108 branches to 506 where it operates that phase of inverter 300 in 2 level mode current generation and branches back to 502 where it again checks whether the short circuit failure condition is present. If the output voltage and output current of a phase do not have the same direction, controller 108 branches to 508 where it operates that phase of inverter 300 in 3 level mode current generation and branches back to 502. If at 502 a short circuit condition is not present, controller 108 branches back to 500.

By operating inverter 300 in the above described manner during a short circuit failure event, the peak current limit ($I_{pk}$) can be increased compared to operating inverter 300 only in two-level mode. Illustratively, this increased peak current limit is determined during the design of inverter 300, such as heuristically or mathematically, and programmed into controller 108. This allows inverter 300 to feed more current to the load having the short circuit failure to blow the fuse protecting the load more quickly. This improves clearing a short of a load coupled to an output of the inverter 300 when the load experiences a short circuit event.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. In an uninterruptible power supply system having a three-level T-Type inverter, a method of controlling with a controller the three-level T-Type inverter to clear a short circuit of a load coupled to an output of the three-level T-Type inverter when the load experiences a short circuit event, comprising:

upon the load having the short circuit, controlling the three-level T-Type inverter with the controller to commutate each phase of the three-level T-Type inverter in a two level mode current generation when output voltage and output current of that phase have a same direction and to commutate each phase of the three-level T-Type inverter in a three level mode current generation when the output voltage and the output current of that phase have opposite directions.

2. The method of claim 1 wherein the three-level T-Type inverter has an inverter leg for each phase of the three-level T-Type inverter, each inverter leg having a plurality of power switching semiconductors interconnected in a three-level T-Type inverter topology, wherein commutating with the controller each phase of the three-level T-Type inverter in the two level mode current generation when the output voltage and the output current of that phase have the same direction includes commuting with the controller the power switching semiconductors of that phase in the two level mode current generation and commutating with the controller each phase of the three-level T-Type inverter in the three level mode current generation when the output voltage and the output current of that phase have the opposite directions includes commuting with the controller the power switching semiconductors of that phase in the three level mode current generation.

3. The method of claim 2 wherein upon the output voltage and the output current of any phase of the three-level T-Type inverter transitioning between being in the same direction to being in the opposite directions, changing the commutation with the controller of that phase of the three-level T-Type inverter from the two level mode current generation to the three level mode current generation when the output voltage and the output current of that phase has transitioned from being in the same direction to being in the opposite directions and changing the commutation with the controller of that phase of the three-level T-Type inverter from the three level mode current generation to the two level mode current generation when the output voltage and the output current of that phase has transitioned from being in the opposite directions to being in the same direction.

* * * * *